(12) United States Patent
Odenwalder et al.

(10) Patent No.: US 6,795,508 B1
(45) Date of Patent: Sep. 21, 2004

(54) METHOD AND APPARATUS FOR OBTAINING TRANSMIT DIVERSITY USING SWITCHED ANTENNAS

(75) Inventors: Joseph P. Odenwalder, Del Mar, CA (US); Stein A. Lundby, San Diego, CA (US); Charles E. Wheatley, III, Del Mar, CA (US); Edward G. Tiedemann, Jr., San Diego, CA (US)

(73) Assignee: QUALCOMM, Incorporated

( * ) Notice: Subject to any disclaimer, the term of this patent is extended or adjusted under 35 U.S.C. 154(b) by 0 days.

(21) Appl. No.: 09/114,036

(22) Filed: Jul. 10, 1998

Related U.S. Application Data

(60) Provisional application No. 60/067,247, filed on Dec. 2, 1997.

(51) Int. Cl.$^7$ ................................................ H04B 7/02
(52) U.S. Cl. ........................ 375/267; 375/299; 375/146; 455/101
(58) Field of Search ................................. 375/299, 267, 375/146; 370/208, 209; 455/101, 103

(56) References Cited

U.S. PATENT DOCUMENTS

| | | | | |
|---|---|---|---|---|
| 5,203,018 | A | | 4/1993 | Hirose .......................... 455/61 |
| 5,570,349 | A | | 10/1996 | Bustamante et al. .......... 370/18 |
| 5,614,914 | A | * | 3/1997 | Bolgiano et al. ............ 342/364 |
| 5,652,764 | A | * | 7/1997 | Kanzaki et al. .............. 375/130 |
| 5,663,990 | A | * | 9/1997 | Bolgiano et al. ............ 375/347 |
| 5,689,439 | A | * | 11/1997 | Weerackody et al. ........ 375/295 |
| 6,038,263 | A | * | 3/2000 | Kotzin et al. ................ 375/299 |
| 6,173,005 | B1 | * | 1/2001 | Kotzin et al. ................ 375/141 |
| 6,360,080 | B1 | * | 3/2002 | Yun et al. .................... 455/103 |

FOREIGN PATENT DOCUMENTS

| | | |
|---|---|---|
| CA | 2234923 | 11/1998 |
| EP | 0566257 | 3/1993 |
| EP | 0744841 | 5/1996 |
| EP | 0755127 | 7/1996 |
| EP | 0744841 | * 11/1996 |
| EP | 0755127 | * 1/1997 |
| JP | 55077247 | 10/1980 |

* cited by examiner

*Primary Examiner*—Temesghen Ghebretinsae
(74) *Attorney, Agent, or Firm*—Philip R. Wadsworth; Sandra L. Godsey

(57) ABSTRACT

A method and apparatus for providing diversity transmissions to a mobile unit from a transmitting station having at least first and second antennas by repeatedly switching between the two antennas during the transmission of information to the receiving unit. Message information is transmitted from the first antenna in the transmitting station to the receiving unit. After the start of the transmission of the message information from the first antenna, transmission of the message information from the first antenna to the receiving unit terminates and transmission of the message information from the second antenna in the transmitting station to the receiving unit is initiated. Some time after transmission of the message information from second antenna is initiated, the transmission of the message information from the second antenna to the receiving unit terminates and transmission of the message information from the first antenna in the transmitting station to the receiving unit is initiated. Repeated switching between the first and second antennas is achieved by repeating the process. The switching results in diversity transmissions that improve the ability of a receiving unit to receive the coded and interleaved transmitted message information from the transmitting station. The interleaver disperses the encoded symbols in each antenna dwell period such that the decoder decisions are based on a mix of symbols form each antenna. Therefore the decoder decisions are unreliable only when the mix of symbols from the different antennas, with different fading characteristics, are unreliable over the span of symbols the decoder uses in its decision process.

16 Claims, 3 Drawing Sheets

METHOD AND APPARATUS FOR OBTAINING TRANSMIT DIVERSITY USING SWITCHED ANTENNAS

This application claims benefit to Provisional application Ser. No. 60/067,247 filed Dec. 2, 1997.

BACKGROUND OF THE INVENTION

I. Field of the Invention

The present invention relates generally to wireless radio telephone systems that use a transmitting station having at least two antennas for transmitting information to one or more receiving units served by the transmitting station. More particularly, the present invention relates to a novel and improved method and apparatus for providing diversity transmissions to a receiving unit served by the transmitting station.

II. Description of the Related Art

It is well known in the art that the performance of the reverse link of a wireless communications system can be improved by providing multiple transmission paths. With multiple transmissions paths, a diversity gain is obtained by combining the phase and amplitude adjusted signals from the different paths when they are received. The combined signal is less likely to fade to an unexceptable level because deep fades in the combined signal occur only when the fades in the individual paths are aligned with each other.

It is also possible to obtain signal diversity in the channel from the base to the mobile, i.e. in the forward link. However, obtaining signal diversity in the forward link is more difficult than obtaining it in the reverse link because mobile units must be as small and simple as possible. Dual mobile receive antennas are commonly used in a mobile unit in some parts of the world. For example, in Japan, it is common to use dual receive antennas with the PDC (Personal Digital Cellular) system. Most of these antennas are switched (i.e., the signal is not received simultaneously by both antennas). This has the advantage of sharing the front end hardware in the mobile station, but does not result in as good a reception as the case in which both antennas are receiving simultaneously. However, this approach increases the cost of each of the more numerous mobile receivers. There are several ways known in the prior art to obtain transmit diversity on the forward link with only one mobile receive antenna.

One consideration in providing transmit diversity in a code division multiple access (CDMA) communication link is the fact that each of the transmit channels are transmitted orthogonally to each other. One such CDMA system is described in Electronics Industry Association standard TIA/EIA/IS-95-A, entitled "Mobile Station-Base Station Compatibility Standard for Dual-Mode Wideband Spread Spectrum Cellular System". By transmitting signals that are orthogonal to each other, the capacity of the system is significantly increased as the interference between channels is reduced between channels. In the TIA/EIA/IS-95-A CDMA system, each channel is distinguished from each other channel by an orthogonal Walsh code. For these codes to remain totally orthogonal at the receiver, there cannot be any "multipath" (i.e., more than one path between the transmitter and receiver) on the forward link. When there is a multipath, multiple signal "components", each having different delays, are received. Each such component comprises a number of channels. The channels within a particular multipath component are orthogonal to each other, but are not orthogonal to the channels in a different multipath component assuming that the amount of path delay between transmission and reception differs for each such component due to these differences.

In one prior art method, multiple delayed versions of the forward link signal can be transmitted. Different forward link signals are transmitted by different separate antennas. This provides multipath which provides diversity. If the delayed versions are separated by enough time, the mobile station's receiver can resolve the different multipaths and obtain the benefit of the diversity (e.g., the transmissions from each antenna will typically not fade together). However, this method has the disadvantage that in a CDMA system, the multiple paths interfere with each other, since they are not orthogonal due to a misalignment of the Walsh codes of the undelayed signal with respect to the delayed signal. Even when the base to mobile link only produces one resolvable path, the additional paths from the signals radiated by the other antennas interfere with the original signal. Similarly, the original signal will not be orthogonal to the delayed signal, and so will interfere with the signals radiated by the other antennas.

In another method, the forward signal can be transmitted from multiple base station antennas using a different carrier frequency for each antenna. In this case, the same modulation symbols can be sent on different frequencies. Alternatively, error correcting coding may be used and the code symbols can be sent on different frequencies. Several combinations of these methods can be used. Since the signals are on different carrier frequencies, the received signals at the mobile do not interfere with one another. Additionally, different frequencies have different fading characteristics, especially if the frequencies are widely separated. This helps to provide different diversity paths. The forward signal can also be transmitted on multiple base station antennas with the same carrier frequency using orthogonal waveforms. For example, in a CDMA system different Walsh codes can be used on the multiple antennas. Code symbols for any user can be transmitted using one Walsh code on one antenna and another Walsh code on another antenna. If the transmit antennas are close to each other and the signals transmitted over the primary paths received from the multiple base station antennas are time aligned, the signals remain orthogonal. Thus, with small primary path time differences, a receiver for a finger of the rake does not receive interference from the other primary paths. However, when there is more than one path, each with different delays from a base station to the mobile, the paths will not be received as orthogonal to one another.

These problems and deficiencies are recognized and solved by the present invention in the manner described below.

SUMMARY OF THE INVENTION

The present invention provides a receiving station with diversity transmissions from a base station having at least first and second antennas. The invention does so by repeatedly switching one, several, or all of the code channels of the composite signal between the two antennas during the transmission, such that the switched code channels are transmitted alternately from the first and second antenna. In accordance with a preferred embodiment, all of the code channels from the base station are transmitted from the first antenna in the base station to the receiving units. After the start of the transmission of the information from the first antenna, transmission of the information from the first antenna to the receiving unit terminates and transmission of the message information from the second antenna in the base station to the receiving unit is initiated. After transmission of the message information from the second antenna is initiated, transmission of the message information from the second antenna to the receiving unit terminates and transmission of the message information from the first antenna in the base station to the receiving unit is initiated. This process of switching between the first and second antennas is repeated. Preferably, the switching occurs on Walsh code boundaries in order to maintain the orthogonality of the Walsh codes. If Walsh codes of varying lengths are used, then the switching preferably occurs on the boundaries of the longest Walsh codes. Accordingly, Walsh codes are not split between the first and second antennas. Rather, a full Walsh code is transmitted from the first antenna before the transmit signal is switched to the second antenna. Likewise, a full Walsh code is transmitted from the second antenna before the transmit signal is switched back to the first antenna. Assuming that the switching occurs relatively rapidly with respect to the size of a block of interleaved data, the switching results in diversity transmissions that improve the ability of a receiving unit to receive the coded and interleaved message information that is transmitted from the base station. The interleaver disperses the encoded symbols in each antenna dwell period such that the decoder decisions are based on a mix of symbols from each antenna. Therefore, the decoder decisions are unreliable only when the mix of symbols from the different antennas, with different fading characteristics, are unreliable over the span of symbols the decoder uses in its decision process.

BRIEF DESCRIPTION OF THE DRAWING

The features, objects and advantages of the present invention will become more apparent from the detailed description set forth below when taken in conjunction with the drawing in which like reference characters identify correspondingly throughout and wherein.

DETAILED DESCRIPTION OF THE PREFERRED EMBODIMENTS

Figure 1:
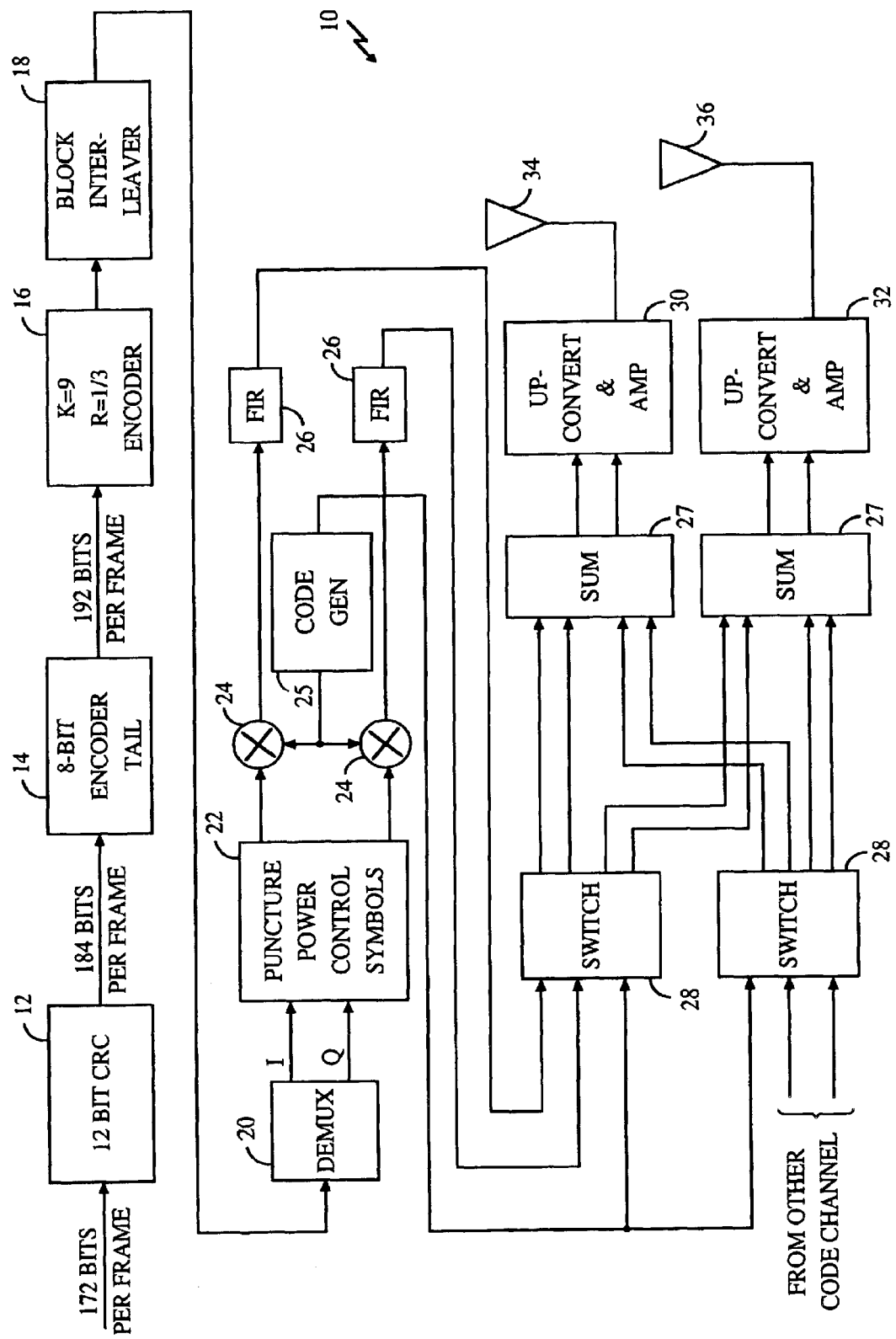
FIG. 1 is a block diagram of a system for providing transmit diversity by switching code channels between first and second antennas.

Referring to the drawing, there is shown switched antenna diversity system 10 of the present invention. Switched antenna diversity system 10 provides transmit diversity by switching a transmit signal among multiple antennas, for example antennas 34, 36. In accordance with one embodiment a single code channel is switched. In accordance with another embodiment, several code channels of a forward link are switched together. In yet another embodiment, all of the code channels of a forward link are switched together (i.e., the entire forward link is switched). While only two antennas 34, 36 are shown in order to simplify the drawing, it will be understood that any number of antennas can be provided within diversity system 10. Furthermore, the method of switching the signal among the multiple antennas described herein can be applied to any number of antennas, assuming that the antennas are within a predetermined distance of one another. The predetermined distance being such that the received signals from these antennas remain orthogonal upon receipt (i.e., the difference in path delay from each antenna to the receiver is not too great). In one embodiment of the present invention, the antennas may be merely separate feeds of the same antenna. Furthermore, the antennas or separate feeds may be polarized differently to provide additional diversity. Additionally, while switched antenna diversity system 10 is described with respect to transmissions from a base station to a mobile unit, it will be understood that the method of the present invention can be applied to transmissions from any transmitting station to any receiving unit.

Figure 2:
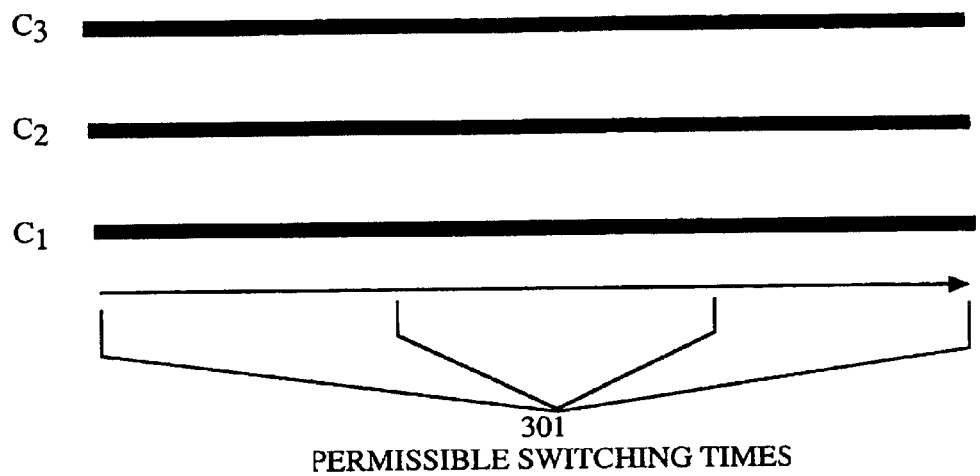
FIG. 2 is an illustration of the permissible switching times in accordance with one embodiment of the present invention.

In accordance with one embodiment of the present invention used with a CDMA system which complies with TIA/EIA/IS-95-A, a composite signal from a base station consists of multiple "code channels". Each code channel is intended to be received by one or more receiving units. Information which is represented by an "information signal" will be transmitted over each such code channel. In accordance with TIA/EIA/IS-95-A, each code channel is distinguished from the other code channel by use of Walsh functions. However, it should be understood that other functions, preferably orthogonal functions, can be used to distinguish code channels from one another. The information signal which represents the information to be transmitted is received by error-detection cyclic code redundancy check block 12, wherein a cyclic redundancy code (CRC) is added in a conventional manner, such as described in TIA/EIA/IS-95-A. As described in TIA/EIA/IS-95-A, the information signal data can be fixed or variable rate. An error-correction encoder tail is added in block 14. Encoding and block interleaving are performed on the transmit signal in blocks 16, 18, respectively. As is well known in the art, interleaving a block of data allows relatively short "bursty" errors to be distributed throughout the entire block. By so doing, the errors are more likely to be correctable by an error correction device, such as a Viterbi decoder. The transmit signal is demultiplexed in block 20 to provide orthogonal I and Q bit stream signals. Power control information can be punctured into the bit stream signals in block 22. The resulting transmit signals are multiplied by the Walsh function in mixers 24 for each particular code channel. Any additional PN spreading can be added by mixers similar to mixers 24. The resulting signals are filtered by finite impulse response filters 26. The Walsh codes are generated by Walsh generator 25, which is coupled to both mixers 24 and switch 28. The filtered transmit signals are applied to switch 28. Switch 28 couples the filtered transmit signal alternately to first and second adders 27. The adders combine other switch outputs for other code channels. The output of the adders 27 are coupled to upconverters and power amplifiers 30 and 32. Walsh generator 25 provides a signal to switch 28 which indicates when the Walsh boundaries occur, thus allowing the switch 28 to alternate change at the Walsh code boundaries. FIG. 2 illustrates the permissible switching times, which occur at the Walsh code boundaries 301. Specifically, if the Walsh function being used by the particular code channel illustrated in FIG. 1 is not the longest Walsh function being used, then the switching signal from code generator 25 should correspond to the longest Walsh function being used. The switched signals from upconverters 30, 32 are transmitted by antennas 34, 36. The switch preferably switches at a rate that ensures several portions of each interleaver block are transmitted from each of the antennas 34, 36. Since a first group of code channels may be transmitted from the first antenna 34 at the same time as a second group of code channels is being transmitted from the second antenna 36, there is a need for two upconverters and two power amplifiers 30, 32.

In an alternate embodiment, impulse response filters 26 can be applied to the outputs of diversity switch 28 rather than to the inputs of diversity impulse response switch 28. This permits cleaner filtering of the transmit signals but requires twice as many impulse response filters 26. In another embodiment, the FIR filters 26 can be after the summer. In this case, only two filters are needed, though they are more complex since they are handling the summed signals. In any case, it is preferred that mobile units include pilot filters for receiving and processing pilot Walsh channel transmissions within switched antenna diversity system 10.

When practicing the method of the present invention, diversity switch 28 applies the outputs of impulse response filters 26 alternately to Path A and Path B of diversity system 10 for alternate transmission from antennas 34, 36. The alternate transmissions from antennas 34, 36 have different fade characteristics and can therefore be combined at the receiving unit to provide the required transmit diversity for the receiver unit. It will be understood that the present invention is described in a system for providing diversity signals by a base station to a mobile unit for illustrative purposes only. The present invention can be applied to any diversity transmission, including transmissions from a mobile unit having multiple mobile unit antennas to a base station or other receiver.

The switching and controller operations performed by diversity switch 28 can be obtained using any type of switching device suitable for alternately applying pilot and transmit signals to the multiple antenna paths of diversity system 10. For example, diversity switch 28 can be formed of conventional digital logic switching circuits wherein digital switches corresponding to each antenna are alternately opened and closed.

In one embodiment of the invention, all switches coupled the signals input to the switches to the same antenna at any one time. For this embodiment, all signals including the pilot channel are radiated from the same antenna at the same instant. When the switch is switched, all signals including the pilot channel are radiated from the other antenna.

In an alternate embodiment of the invention, a pilot signal can be continuously applied to both antennas 34, 36, and the switching operations of diversity switch 28 can be performed upon the traffic signals only. This approach requires that the two pilot signals be orthogonal and can therefore increase interference between the transmit signals. These pilot signals can be made orthogonal by using different Walsh or other orthogonal functions.

The speed of the switching of the transmit signals to the multiple paths of diversity system 10 is not critical. The switching can even be random. In general, if the switching speed is too slow, there is an insufficient amount of diversity. However, if the switching speed is too fast, the frequency spectrum of the transmit signals is expanded causing interference with signals on adjacent carrier frequencies.

In an alternative embodiment, the entire forward link is switched including the pilot channel, a slow switching rate makes it difficult for the receiving unit to perform accurate channel estimation from the signals from the different antennas. Channel estimation consists of estimating the received signal phase, amplitude, and any other parameters which are necessary during the reception process. Faster switching speeds make it easier for the receiving unit to track the signals from the different antennas. By switching fast, the channel conditions will not have changed from the previous time a particular antenna was being used. This makes it easier to demodulate the received signals and makes it easier to use the channel estimate that was obtained during the previous dwell using the particular antenna for the current channel estimate. Again, if the switching speed is too fast the frequency spectrum of the transmit signals is expanded causing interference with signals on adjacent carrier frequencies. In the preferred embodiment of the invention, the switching period of antennas 34, 36 is equal to an integer multiple of the Walsh sequence period and occurs on Walsh code boundaries. This maintains the orthogonality of the channels. In switch antenna diversity system 10 having a chip rate of 3.6864 Mchips/s, Walsh functions are 128 chips in length for the traffic channel. Walsh functions for pilot channels can be longer, but not too long due to channel coherence time issues. Thus, a preferred antenna switching rate is every 512 chips.

Furthermore, it will be understood that the switching between antennas 34, 36 does not have to be ideal. For example, the trailing off of outputs from filters 26 may cause some overlap in the transmissions from antennas 34, 36 when transmission by one antenna terminates and transmission from another initiates.

Figure 3:
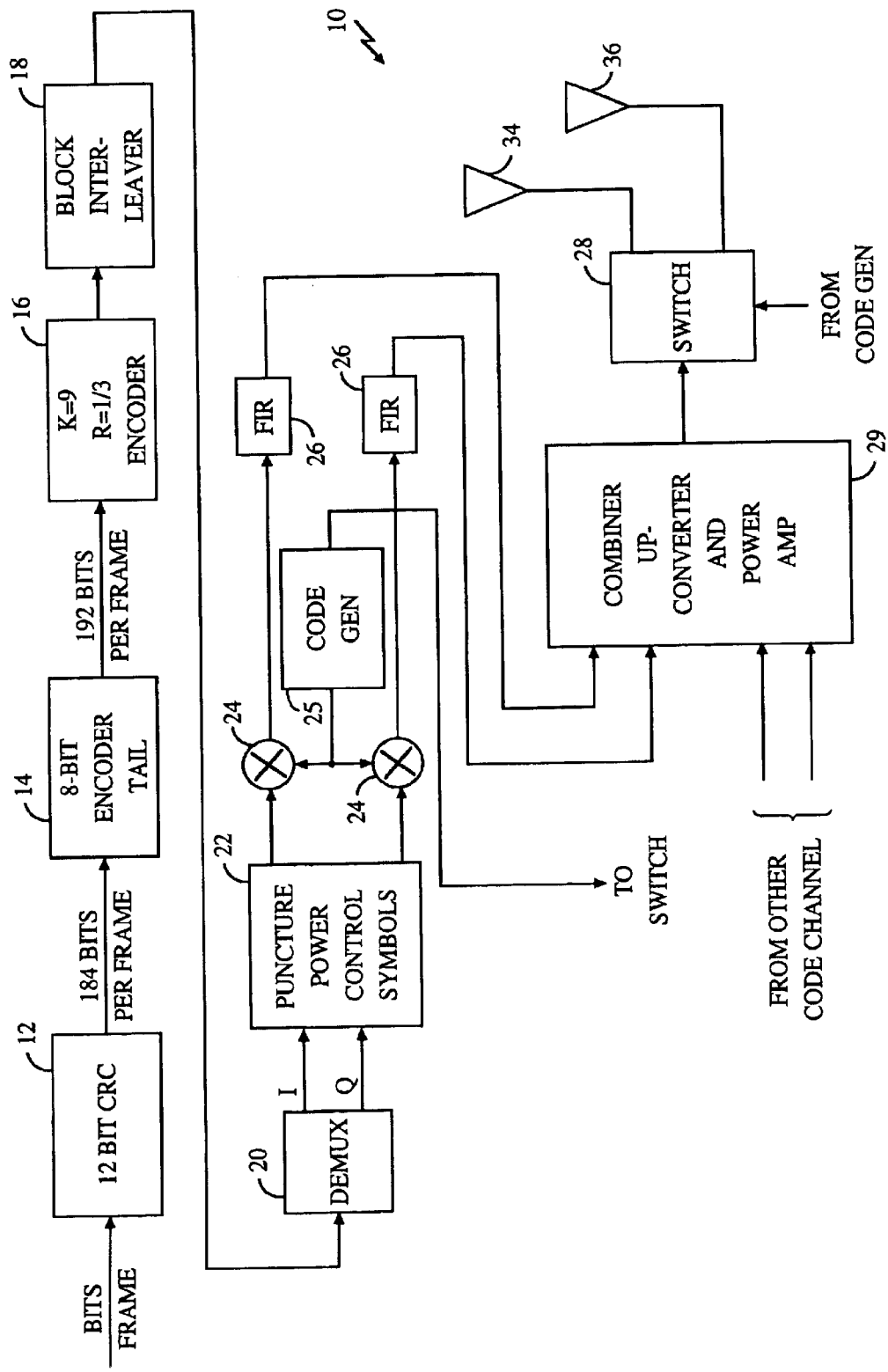
FIG. 3 is a block diagram of a system in which the entire forward link is switched between a first and second antenna.

In an alternative embodiment of the present invention, when switching is done on the entire forward link at once (that is, all of the code channels that make up the forward link are switched together including the pilot) there need only be one upconverter and power amplifier. The switch 28 is placed between a combiner, upconverter, and power amplifier 29 (shown as one block for simplicity) and the antenna, as shown in FIG. 3.

Figure 4:
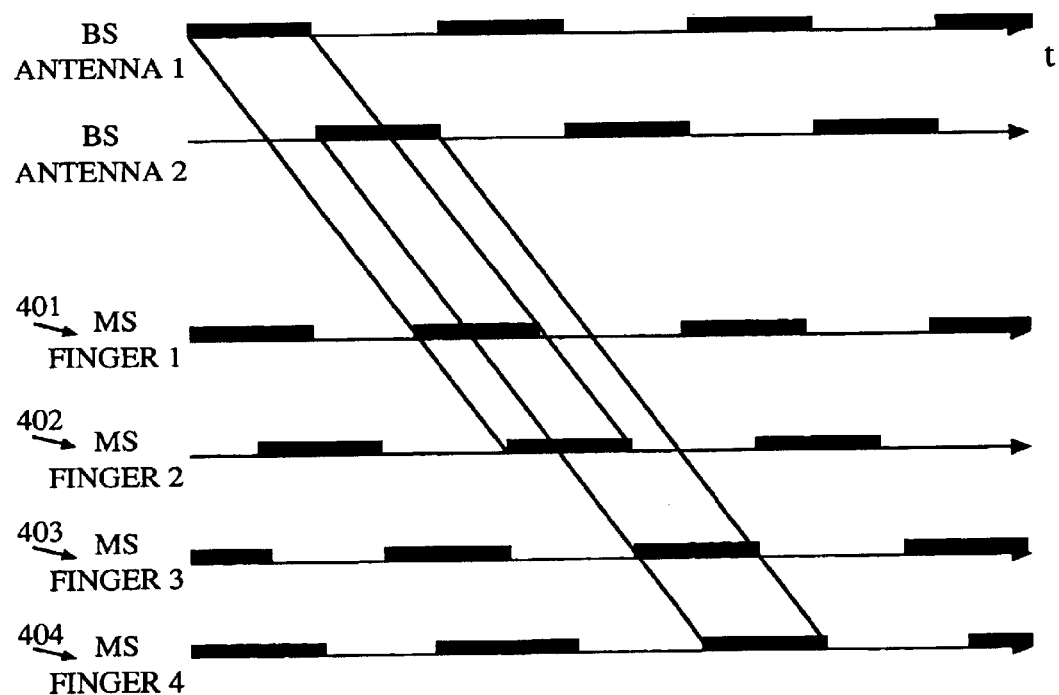
FIG. 4 is an illustration of the relationship between transmit signals transmitted from two base station antennas and received at a mobile unit.

FIG. 4 illustrates the relationship between the signals that are sent from a base station over a first and second antenna, and the receipt of those signals at a mobile unit. As shown in FIG. 4, the mobile unit receives a first signal on a first and second finger of a rake receiver within the mobile unit. Likewise, the mobile unit receives the second signal on a third and fourth finger of the rake receiver within the mobile unit. In practice, the base station antennas are located close enough to one another that the path delays are almost the same from the two antennas. In particular, the path delays for finger 1 and 3 in the figure would be nearly the same; similarly, the path delays for fingers 2 and 4 would be nearly the same. This would permit finger 1 and 3 (and 2 and 4) to be the same physical finger with the finger being switched quickly between paths 1 and 3 and 2 and 4.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A communication apparatus with transmit diversity, comprising:

a bit stream signal generator that generates bit stream signals, punctures power control symbols into message symbols in the bit stream signals, and error-correction encodes the message symbols;

an orthogonal code generator coupled to the bit stream signal generator to generate coded signals in a plurality of code channels and a control signal to indicate a boundary of a code sequence;

at least one switch coupled to the orthogonal code generator to switch the coded signals between at least two output signal paths in response to the control signal; and at least two antennas disposed on said at least two output signal paths to transmit the coded signals alternately in a plurality of time intervals, each of the time intervals being an integral multiple of a time period of the code sequence.

2. The apparatus of claim 1, wherein each of the time intervals is a time period of a predetermined portion of an interleaver block.

3. The apparatus of claim 1, wherein the orthogonal code is a Walsh code.

4. The apparatus of claim 1, wherein said at least one switch switches pilot and traffic signals alternately between said at least two output signal paths.

5. The apparatus of claim 1, wherein said at least one switch switches traffic signals alternately between said at least two output signal paths and directs pilot signals to said at least two antennas continuously.

6. The apparatus of claim 1, further comprising at least one mixer connected to the bit stream signal generator and the orthogonal code generator to generate the coded signals.

7. The apparatus of claim 6, wherein said at least one mixer comprises two mixers to generate in-phase (I) coded signals and quadrature (Q) coded signals.

8. The apparatus of claim 6, further comprising at least one filter connected between said at least one mixer and said at least one switch.

9. The apparatus of claim 1, wherein the bit stream signal generator further comprises means for generating in-phase (I) and quadrature (Q) bit stream signals on two signal paths.

10. The apparatus of claim 9, wherein the bit stream signal generator further comprises means for interleaving the message symbols.

11. The apparatus of claim 10, wherein the means for interleaving the message symbols comprises a block interleaver.

12. The apparatus of claim 1, wherein comprises a Viterbi encoder.

13. The apparatus of claim 1, wherein the bit stream signal generator further comprises means for adding an error-correction encoder tail to the message symbols.

14. The apparatus of claim 13, wherein the bit stream signal generator further comprises means for detecting errors in an input bit stream.

15. The apparatus of claim 14, wherein the means for detecting errors in the input bit stream comprises means for performing cyclic redundancy check (CRC) on the input bit stream.

16. The apparatus of claim 1, wherein the code channels are switched between the at least two antennas, and wherein the at least two antennas alternately transmit the code channels.

* * * * *